April 16, 1963    O. E. RHODES    3,085,361
FISHING LURE
Original Filed Dec. 16, 1960
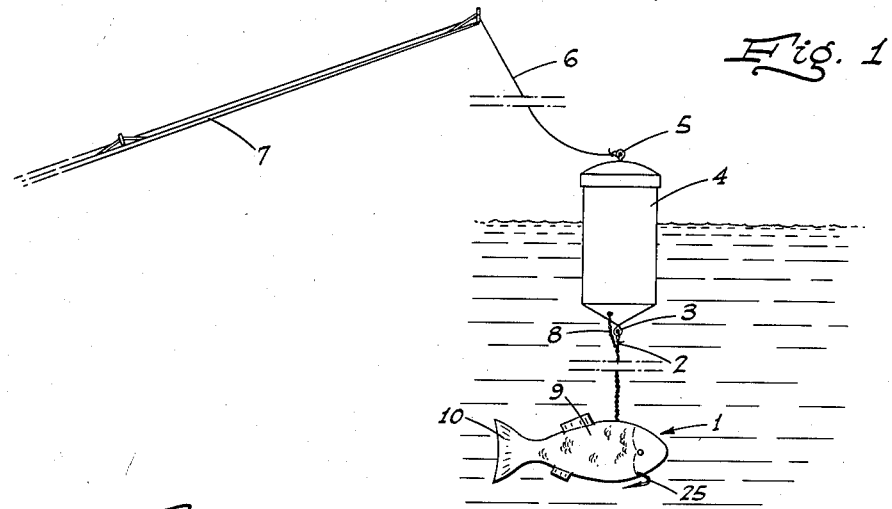
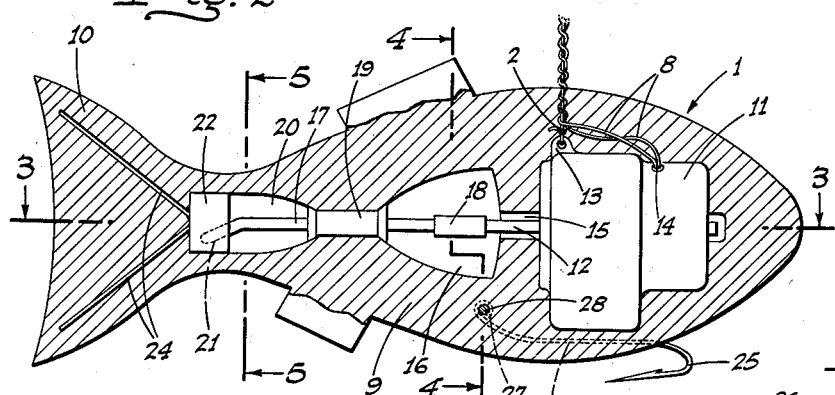
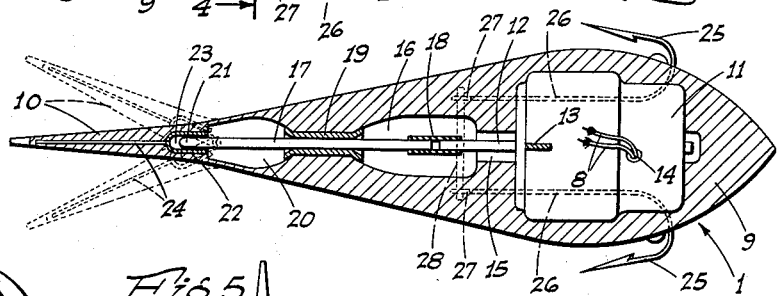
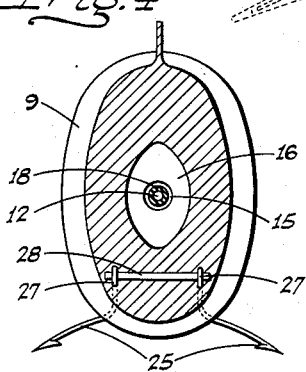
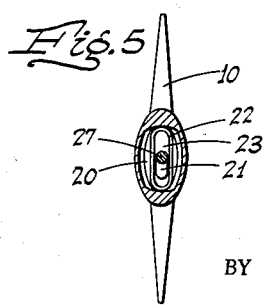
INVENTOR
Orville E. Rhodes
BY   Webster & Webster
ATTORNEYS

United States Patent Office 3,085,361
Patented Apr. 16, 1963

3,085,361
FISHING LURE
Orville E. Rhodes, Stockton, Calif., assignor to Lectrolure Company Inc., Stockton, Calif., a corporation of California
Continuation of application Ser. No. 76,374, Dec. 16, 1960. This application May 21, 1962, Ser. No. 198,695
4 Claims. (Cl. 43—26.2)

This invention relates in general to an improved artificial lure for fishing; the present application being a continuation of application Serial No. 76,374, filed December 16, 1960.

In particular the invention is directed to, and it is a major object to provide, an artificial lure in the form of a minnow and which includes a power actuated tail capable of life-like lateral wiggling or sculling motion so as to cause the lure to swim about in the water in a manner closely simulating a live bait fish, whereby to attract and cause game fish to strike.

Another important object of this invention is to provide an artificial lure, as in the preceding paragraph, which includes—within the confines of such lure—a novel electric motor driven mechanism operative to produce the desired lure propelling motion of the tail.

An additional object of the invention is to provide an artificial lure, of the type described, wherein the electric motor driven mechanism produces—when in operation—a vibration or sound which further enhances the attraction of the lure.

It is also an object of the invention to provide a fishing lure which is designed for ease and economy of manufacture.

A still further object of the invention is to provide a practical, reliable, and durable fishing lure, and one which will be exceedingly effective for the purpose for which it is designed.

These objects are accomplished by means of such structure and relative arrangement of parts as will fully appear by a perusal of the following specification and claims.

In the drawings:

FIG. 1 is a view showing the lure as in use.

FIG. 2 is an enlarged longitudinal sectional elevation of the lure.

FIG. 3 is a sectional plan view taken substantially on line 3—3 of FIG. 2, but with the electric motor shown in full.

FIG. 4 is a cross section on line 4—4 of FIG. 2.

FIG. 5 is a cross section on line 5—5 of FIG. 2.

Referring now more particularly to the drawings and to the characters of reference marked thereon, the novel artificial lure is indicated generally at 1, and is used in the manner illustrated in FIG. 1. As shown in such figure a flexible leader 2 of some length, but here shown foreshortened, extends from the lure upwardly for connection with an eye 3 on the lower end of a float 4. At the top such float 4 includes another eye 5 to which the line 6, from a fishing rod 7, is connected.

The float 4 is a water-tight container in which is disposed a battery and switch assembly (not shown). A very small water-proof, two-wire electric cord 8, connected to the battery and switching assembly in the float 4, leads out of the same, and thence extends downwardly to the lure 1; such cord being wound about the leader 2.

At their lower ends the leader 2 and the cord 8 both enter the lure 1 at the top and intermediate the ends thereof; such leader and cord being connected within the lure in the manner hereinafter described.

The lure 1 is constructed in the manner shown in detail in FIGS. 2-5 inclusive, and comprises the following:

The numeral 9 indicates a body formed or shaped to simulate a minnow, which body includes a tail 10 capable of lateral wiggling or sculling motion. Such motion is possible by reason of the fact that the body 9 is—in its entirety—formed of a flexible and resileint material, such as rubber. While here shown as one piece, the body 9—in practice—may be constructed of two initially separate longitudinal halves vulcanized together after introduction into the body of the working parts.

The working parts of the lure constitute a very small, relatively high speed electric motor 11 embedded in the forward portion of the body 9 and which motor includes a longitudinal, rearwardly projecting drive shaft 12.

The leader 2 extends into the body 9 from the top and is secured to an eye 13 on the upper side of the motor 11; the electric cord 8 following the leader into the body and thence passing into the electric motor 11, as at 14. With this arrangement the lure is effectively suspended by the leader 2, and with the electric cord 8 connected to the motor without undue tension.

The drive shaft 12 extends rearwardly from the electric motor 11 through a longitudinal bore 15, and such shaft terminates at its rear end in a cavity 16 in body 9.

A driven, extension shaft 17 is alined with, and extends rearwardly from, the drive shaft 12; the adjacent ends of said shafts being connected together within cavity 16 by a flexible sleeve coupling 18. From the cavity 16 the driven shaft 17 passes in guided or journaled relation through a bearing tube 19 secured in the body 9 between cavity 16 and another and rearwardly disposed cavity 20; such cavity 20 extending from the rear portion of the body 9 into the forward portion of the tail 10.

At its rear end, and within the cavity 20, the driven shaft 17 is formed with a relatively short, rearwardly diagonal finger 21.

A bushing 22 is fixed in the body 9 at the rear of the cavity 20, and which is in the forward portion of the tail 10; such bushing having a forwardly opening, vertically elongated slot 23 therein. The diagonal finger 21, on the rear end of the driven shaft 17, projects into the slot 23 of bushing 22.

As shown in FIGS. 3 and 5, the diameter of the diagonal finger 21 approximates the transverse width of the vertically elongated slot 23. However, the relative dimensions are such that the finger 21 has a close but free running engagement between the sides of said slot 23. Additionally, the slot 23 is of a vertical length or height so that it extends above and below the high and low points of the path of said finger as the latter rotates.

A pair of rods 24 are fixed to the back or rear of the bushing 22 and thence extend in diverging relation, in a longitudinal vertical plane, in the tail 10. Such rods 24 are manually bendable by manipulating corresponding portions of the tail 10; the bending of such rods being for the purpose of directional control of the lure when it is in operation.

Rearwardly facing hooks 25 are exposed on opposite sides of the body 9 adjacent but short of its forward end, and such hooks include substantially parallel shanks 26 embedded in the body 9. At their rear ends the shanks 26 include eyes 27, and a cross road 28—likewise embedded in the body 9—spans between and projects through such eyes 27 whereby to effectively anchor the shanks 26 against longitudinal displacement.

In operation of the above described lure, and with the same rigged in the manner shown in FIG. 1, the electric motor 11 is energized through the medium of the battery and switch assembly (not shown) in the float 4 and the electric cord which leads from such assembly to such motor.

Upon energization of the electric motor 11 the drive shaft 12 and driven shaft 17 are rotated at relatively high speed, which results in the diagonal finger 21 rotating in a circular path. With such rotation of the diagonal finger 21 the bushing 22 is transversely oscillated, but by reason of the elongation of the slot 23 no vertical oscillation of such bushing occurs.

With such transverse oscillation of the bushing 22, and by reason of the diagonal of finger 21 with its close but free running engagement in the slot 23, said bushing 22 and tail 10 are recurringly and rapidly swung to a rearwardly diagonaled position first to one side and then the other relative to the central vertical longitudinal plane of the lure. See the dotted line positions of bushing 22 and tail 10, as shown in FIG. 3. This produces an action of the tail 10 closely simulating that of the tail of a live fish and effectively propels the lure forwardly through the water.

With the above described diagonal finger and bushing arrangement, it will be seen that the effective pivot of the tail, about which it may swing, is immediately ahead of the rigid tail-embedded bushing 22; the flexible body along the sides of the cavity 20, and which terminates at the forward end of the bushing, being quite thin, as shown in FIG. 3, so that the tail can swing without restraint, without distortion of the body as a whole, and without necessitating the use of any metal or other positive pivot means for the tail swinging mechanism. At the same time, the swinging movement of the tail from side to side is smooth, without any lost motion and with a minimum of wear on the cooperating metal parts.

The length and flexibility of the leader 2 is such that the lure 1 has a relatively wide range of travel and can thus swim about in the water much in the manner of a live bait fish. This is highly attractive to the game fish and causes the latter to strike.

In addition to the swimming motion of the lure 1, its attraction is further enhanced by the fact that the motor driven actuating mechanism within the body 9 causes a certain vibration or sound; it being known that vibration or sound in the water causes game fish to approach the lure, and with a greater likelihood of a strike.

From the foregoing description it will be readily seen that there has been produced such a fishing lure as will fully fulfill the objects of the invention as set forth herein.

While this specification sets forth in detail the present and preferred construction of such fishing lure, still in practice such deviations therefrom may be resorted to as do not form a departure from the spirit of the invention, as defined by the appended claims.

Having thus described the invention the following is claimed as new and useful, and upon which Letters Patent are desired:

1. An artificial lure comprising a minnow-shaped body having a tail capable of lateral wiggling motion, an electric motor in the body, means to supply electric current to the motor, the electric motor being disposed in the forward portion of the body and having a rearwardly projecting longitudinal drive shaft, a driven shaft in the body rearwardly of and alined with the drive shaft, there being a body cavity in which adjacent ends of said shafts are disposed, a coupling between said adjacent ends of the shafts, a longitudinal bearing in the body rearwardly of said body cavity, the driven shaft extending intermediate its ends through such bearing, there being a separate body cavity in which the rear end of the driven shaft is disposed, such separate body cavity extending into the tail, a bushing secured in the part of the separate cavity in the tail, the bushing having a forwardly opening vertically elongated slot therein, and a rearwardly diagonal finger on the rear end of the driven shaft and projecting into said slot whereby rotation of the driven shaft is translated into transverse oscillation of the bushing and resultant lateral wiggling of the tail.

2. In combination, a float adapted for connection to a fishing line, an artificial lure having a portion capable of wiggling motion, power actuated means in the lure including an electric motor operative to impart such wiggling motion to said portion, a flexible leader connecting the float and lure, a source of electric current mounted in the float, and a current carrying cord extending down the leader and connected at its ends to said source and to the motor; the cord being slack relative to the leader.

3. An artificial lure comprising a minnow-shaped body having an integral tail, means formed with the body and tail providing a vertical axis for the lateral swinging of the tail about its forward end relative to the body, a power-driven longitudinal shaft in the body ahead of the tail and terminating at its rear end adjacent the forward end of the tail, and a diagonal finger rigid with and projecting directly back from the rear end of the shaft, the tail at its forward end being provided with a vertically elongated slot into which the diagonal finger projects with relatively close but free running engagement between the sides of the slot.

4. A lure, as in claim 3, in which said means comprises an enlarged cavity in the body extending forwardly from the forward end of the tail slot, and providing relatively thin side walls on the body at the rear end of the cavity; the body material surrounding the cavity being flexible.

References Cited in the file of this patent
UNITED STATES PATENTS

| | | |
|---|---|---|
| 1,446,816 | Taylor et al. | Feb. 27, 1923 |
| 2,472,505 | Yocam et al. | June 7, 1949 |
| 2,511,154 | Garland | June 13, 1950 |
| 2,788,603 | Lindemann | Apr. 16, 1957 |
| 2,882,638 | Moore | Apr. 21, 1959 |
| 2,909,868 | Lewis | Oct. 27, 1959 |